(No Model.)
J. N. McLEAN.
HOSE COUPLING.
No. 603,222.                              Patented Apr. 26, 1898.
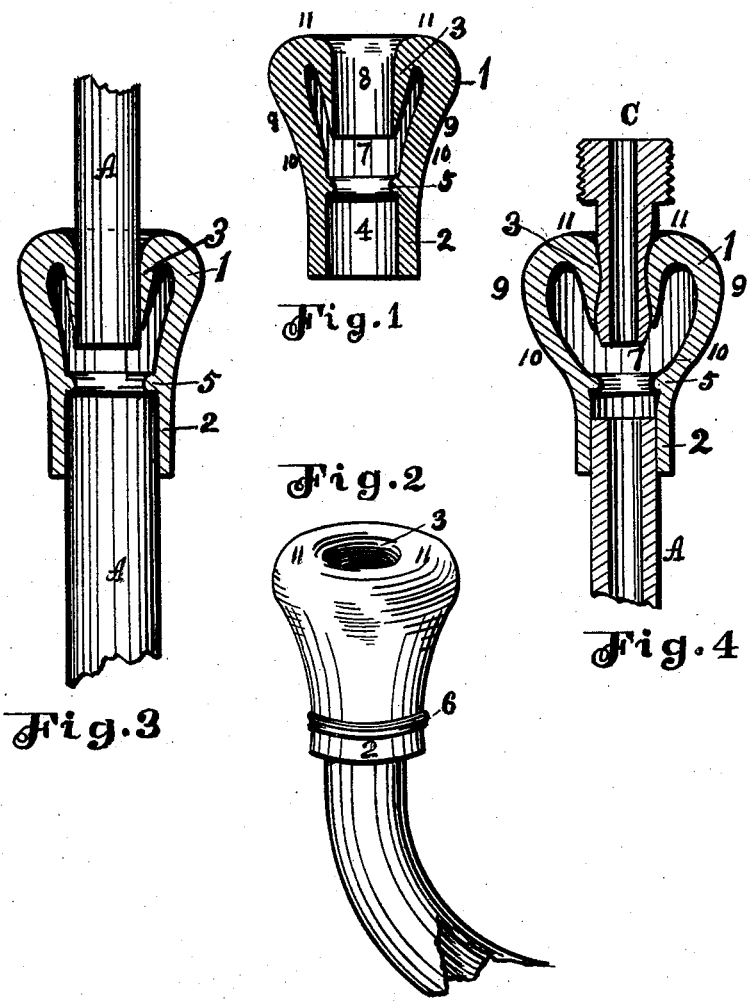
WITNESSES:
John N. McLean
INVENTOR

UNITED STATES PATENT OFFICE.

JOHN N. McLEAN, OF NEW YORK, N. Y.

HOSE-COUPLING.

SPECIFICATION forming part of Letters Patent No. 603,222, dated April 26, 1898.

Application filed January 4, 1897. Serial No. 617,900. (No model.)

*To all whom it may concern:*

Be it known that I, JOHN N. MCLEAN, a citizen of the United States of America, and a resident of the city, county, and State of New York, have invented certain new and useful Improvements in Couplings for Hose, of which the following is a specification.

My invention relates to couplings for hose, pipe, or other articles, such as nipples, faucets, &c. It is designed to be automatic in the operation of clamping itself to whatever it is applied, also to be capable of adjustment to various sizes of articles to which it is to be attached or coupled—that is to say, it has a range of expansiveness that adapts it to serve for the various sizes included in one-third of its minimum capacity, viz: a coupling suitable for three-fourths inch will serve equally well for one inch or any intermediate size.

A want has long been felt for a quick and easy means of detachably coupling hose to bib-faucets or nipples of other hydraulic or pneumatic articles that have not been especially fitted for coupling; also, for coupling hose together, or pipe together, or hose and pipe together, or different sizes of either hose or pipe together—in short, a coupling that can be easily attached fixedly to one article and detachably coupled to another article neither of which have had any especial fitting to adapt it for coupling. The terms "connection" or "connections" when used hereinafter will refer to such articles. The object of my invention is to produce a coupling device that will supply this want. The manner in and the means by which I accomplish this object are fully set forth in the following specification, the drawings herewith forming part thereof.

My invention consists of an elastic shell-body so constructed in form and relative arrangement of parts and chambers that the pressure of the current, whether of gas, air, or fluid, passing through will act in conjunction with the elastic nature and form of its parts and cause it to automatically perform the functions of a grip, thus properly adapting it for the use stated in the premises, explained hereinafter, and particularized in the claims.

In the drawings herewith, Figure 1 is a central longitudinal section of the shell-body of my invention with the sleeve-chambers unoccupied. Fig. 2 is an exterior perspective view of the same with hose attached. Fig. 3 is a central longitudinal section of the same with large pipe attached and small pipe coupled. Fig. 4 is a central longitudinal section showing my invention in expanded form and with pipe and nipple connections.

Like letters and numbers indicate like parts in all the figures.

The letters A, B, and C indicate connections of pipe, hose, and nipple, respectively.

1 is a shell-body, made in form, as shown by Figs. 1 and 2, preferably of rubber vulcanized just enough to stiffen it without destroying its elasticity. This body is made with two sockets or sleeve parts 2 and 3 integral therewith, the sleeve part 2 extended from one end outwardly, and within it is chamber 4, into which the connection is inserted for attachment. The contracted part 5 serves to prevent it from being inserted too far. The elasticity of this sleeve 2 permits the use of a connection of either larger or smaller diameter than the normal diameter of the chamber 4, because the sleeve 2 can be stretched over a larger or drawn down to a smaller by the binding 6, Fig. 2. The sleeve part 3 extends from the other end of the body inward into the chamber 7, the free ends of the two sockets or sleeves thus extending in the same direction. The sleeve 3 is made conical in form, as shown, so that the wall of its inner extremity will be quite thin and capable of contraction by very slight pressure, the wall at its junction with the body-wall being thick enough and the taper sufficient to furnish proper stiffness to the entire sleeve. This sleeve 3 also is elastic, and will stretch over a connection one-third larger than the normal diameter of its chamber 8, so it can readily be slipped over any size of connection within that range. The chamber 7 surrounds the sleeve 3 and is inclosed within the wall 9 9 of the body 1, which is also elastic. When this body 1 is in its normal form or condition, as shown by Fig. 1, the inner surface of its wall at 9 9 is about parallel with the outer surface of the sleeve 3 and very little space is between them, and when in that condition it is quite easy to expand the body at its junction with the sleeve 3, so that it is no obstacle to slipping the sleeve onto a connection, and thus performing the act of coupling; but when the coupling is made and a current under pressure of gas, air, or fluid is made to pass through the chamber 7 whatever pressure such current exerts will be exerted against the inner surface of the body-wall 9 9 and the outer surface of the sleeve 3, thereby acting as a ligature around the sleeve and pressing it tighter and tighter on the connection within it, just in proportion to the pressure exerted by the current. At the same time the pressure against the wall 9 9 will cause it to expand more or less, like unto the form of Fig. 4. The greater the pressure the greater the expansion and the more the body-wall at 11 is tilted and its rim at the junction with the sleeve 3 caused to impinge on the connection, thus fully and completely establishing an automatic grip on the connection, so that however strong the pressure of the current may be it cannot eject the connection. It will be observed that the wall of the body is made thinner at 10 10 to allow the greater expansion at that portion and cause the tilting at 11 11.

Having thus described my invention, what I claim, and desire to secure by Letters Patent, is—

1. A coupling device for pipes, tubes, &c., consisting of a hollow body or shell having two elastic sockets for the reception of the ends of the members to be coupled, one of said sockets extending outward and the other inward into the chamber of the body.

2. A coupling device for pipes, tubes, &c., consisting of a hollow elastic body or shell having at one end and integrally therewith an outwardly-extending socket for the reception of the end of one of the members to be coupled, and at the opposite end an inwardly-extending socket or sleeve for the reception of the other member to be coupled, said inwardly-extending socket projecting into the chamber of the body, and having walls gradually diminishing in thickness toward the inner or free end.

3. A coupling for pipes, tubes, &c., consisting of an elastic hollow body or shell having integral sockets for the reception of the ends of the members to be coupled, one of said sockets extending outwardly from the body and the other inwardly into the chamber thereof, the walls of said inwardly-extending socket gradually diminishing in thickness toward the inner end.

In testimony that I claim the foregoing as my invention I have signed my name, in presence of two witnesses, this 2d day of January, 1897.

JOHN N. McLEAN.

Witnesses:
H. E. STEINHILBER,
J. C. MACLEAN.